(12) United States Patent
Kato

(10) Patent No.: US 10,807,542 B2
(45) Date of Patent: Oct. 20, 2020

(54) VEHICULAR INTERIOR PART INCLUDING SOUND ABSORBING MEMBER

(71) Applicant: TOYOTA BOSHOKU KABUSHIKI KAISHA, Aichi (JP)

(72) Inventor: Takashi Kato, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 103 days.

(21) Appl. No.: 16/139,473

(22) Filed: Sep. 24, 2018

(65) Prior Publication Data

US 2019/0092254 A1    Mar. 28, 2019

(30) Foreign Application Priority Data

Sep. 27, 2017   (JP) ................................. 2017-185651

(51) Int. Cl.
 *B60R 13/08* (2006.01)
 *G10K 11/162* (2006.01)
 *B60R 11/02* (2006.01)
 *B60R 13/02* (2006.01)
 *G10K 11/165* (2006.01)

(52) U.S. Cl.
 CPC ...... *B60R 13/0815* (2013.01); *B60R 11/0217* (2013.01); *B60R 13/0268* (2013.01); *B60R 13/0884* (2013.01); *G10K 11/162* (2013.01); *G10K 11/165* (2013.01)

(58) Field of Classification Search
 CPC . B60R 13/0815; B60R 13/08; B60R 13/0838; B60R 13/0861; B60R 13/083; B60R 5/04; B60R 13/0846; B60R 13/02

USPC ......... 296/39.3, 39.1, 97.23, 198, 204, 37.2, 296/37.14, 1.03; 428/98, 95, 99, 116, 428/121; 181/290, 284, 294, 296, 176
See application file for complete search history.

(56) References Cited

U.S. PATENT DOCUMENTS

| | | | | |
|---|---|---|---|---|
| 4,551,849 A * | 11/1985 | Kasai | .................. | B60R 11/0217 381/152 |
| 6,106,045 A * | 8/2000 | Gac | ......................... | B60R 13/02 296/190.09 |
| 6,226,927 B1 * | 5/2001 | Bertolini | ............. | B60R 11/0217 181/150 |

(Continued)

FOREIGN PATENT DOCUMENTS

JP     2009-173132     8/2009

*Primary Examiner* — D Glenn Dayoan
*Assistant Examiner* — Sunsurraye Westbrook
(74) *Attorney, Agent, or Firm* — Greenblum & Bernstein, P.L.C.

(57) ABSTRACT

A vehicular interior part includes a sound absorbing member including a hole cover section covering a panel-side hole of a panel in which a functional part is to be arranged, a panel cover section covering the panel, slits arranged between the hole cover section and the panel cover section. The slit includes a peripheral extending portion extending along a hole edge of the panel-side hole and a projecting portion extending from an end of the peripheral extending portion toward the panel cover section and a continuous part is between the projection portions of the adjacent slits. The hole cover section is to be torn off from the sound absorbing member at the continuous parts to be separated from the panel cover section and form a hole such that the functional part in the panel-side hole is to be exposed through the panel-side hole and the hole.

13 Claims, 7 Drawing Sheets

(56) References Cited

U.S. PATENT DOCUMENTS

| | | | |
|---|---|---|---|
| 7,066,527 B2 * | 6/2006 | Kohara | B60J 5/0418 296/146.7 |
| 7,913,455 B2 * | 3/2011 | Kruger | B60J 5/0416 49/502 |
| 8,045,744 B2 * | 10/2011 | Close | B60R 11/0217 381/389 |
| 8,881,864 B2 * | 11/2014 | Starling | G10K 11/168 181/290 |
| 9,248,781 B2 * | 2/2016 | Oppliger | B60R 5/044 |
| 2005/0093334 A1 * | 5/2005 | Koa | B60J 5/0416 296/146.5 |

* cited by examiner

VEHICULAR INTERIOR PART INCLUDING SOUND ABSORBING MEMBER

CROSS REFERENCE TO RELATED APPLICATION

This application claims priority from Japanese Patent Application No. 2017-185651 filed on Sep. 27, 2017. The entire contents of the priority application are incorporated herein by reference.

TECHNICAL FIELD

The present disclosure relates to a vehicular interior part including a sound absorbing member.

BACKGROUND

A vehicular interior part including a sound absorbing member on a back surface of a package tray has been known. The package tray includes a tray body and a stop lamp. The sound absorbing member has a slit part at the corresponding position with the stop lamp and the slit part is formed with opposed cut surfaces formed by cutting the sound absorbing member. According to such a configuration, the cut surfaces of the slit part are shifted from each other such that a hole is formed therebetween and the stop lamp is exposed to a back surface side of the package tray through the hole.

Various kinds of functional parts may be mounted or may not be mounted in a vehicle according to a vehicle model or a vehicle specification. The number of kinds of parts included in a vehicular interior part has been demanded to be reduced by using a common component for the vehicles of different vehicle models or vehicle specifications.

SUMMARY

In a configuration of the vehicular interior parts including a common sound absorbing member as a functional part, the functionality of the functional part is required to be maintained. An objective of the present technology is to provide a vehicular interior part with which the number of kinds of parts relating the vehicular interior part is reduced and functionality of a functional part is maintained.

According to the present technology, a vehicular interior part covering a vehicular panel from a vehicular interior side includes an interior part body and a sound absorbing member that is a plate member including fibers and disposed along the vehicular panel and between the interior part body and the vehicular panel, and the sound absorbing member includes a hole cover section covering a panel-side hole of the vehicular panel in which a functional part is to be arranged, a panel cover section covering an upper surface of the vehicular panel, slits that are disposed between the hole cover section and the panel cover section and along which the hole cover section is to be separated from the panel cover section, the slits including a first slit and a second slit that are arranged next to each other such that an end of the first slit and an end of the second slit are opposite each other, and a continuous part that is between the slits and at which the hole cover section is continuous from the panel cover section. The first slit includes a first peripheral extending portion extending along a hole edge of the panel-side hole and a first projecting portion extending from the end of the first peripheral extending portion toward the panel cover section, the second slit includes a second peripheral extending portion extending along the hole edge of the panel-side hole and a second projecting portion extending from the end of the second peripheral extending portion toward the panel cover section, the continuous part is between the first projecting portion and the second projecting portion, and the hole cover section is to be torn off from the sound absorbing member at the continuous part and the hole cover section is to be separated from the panel cover section along the slits such that a hole is to be formed at a position of the hole cover section and the functional part that is in the panel-side hole is to be exposed through the panel-side hole and the hole in the sound absorbing member.

DETAILED DESCRIPTION

One embodiment of the present technology will be described with reference to FIGS. 1 to 7. In this embodiment section, a vehicular interior part 20 including a sound absorbing member 30 will be described as an example. The vehicular interior part 20 is included in a vehicle 10 while covering an upper back panel (a vehicular panel) 13 from a vehicular interior side.

Figure 2:
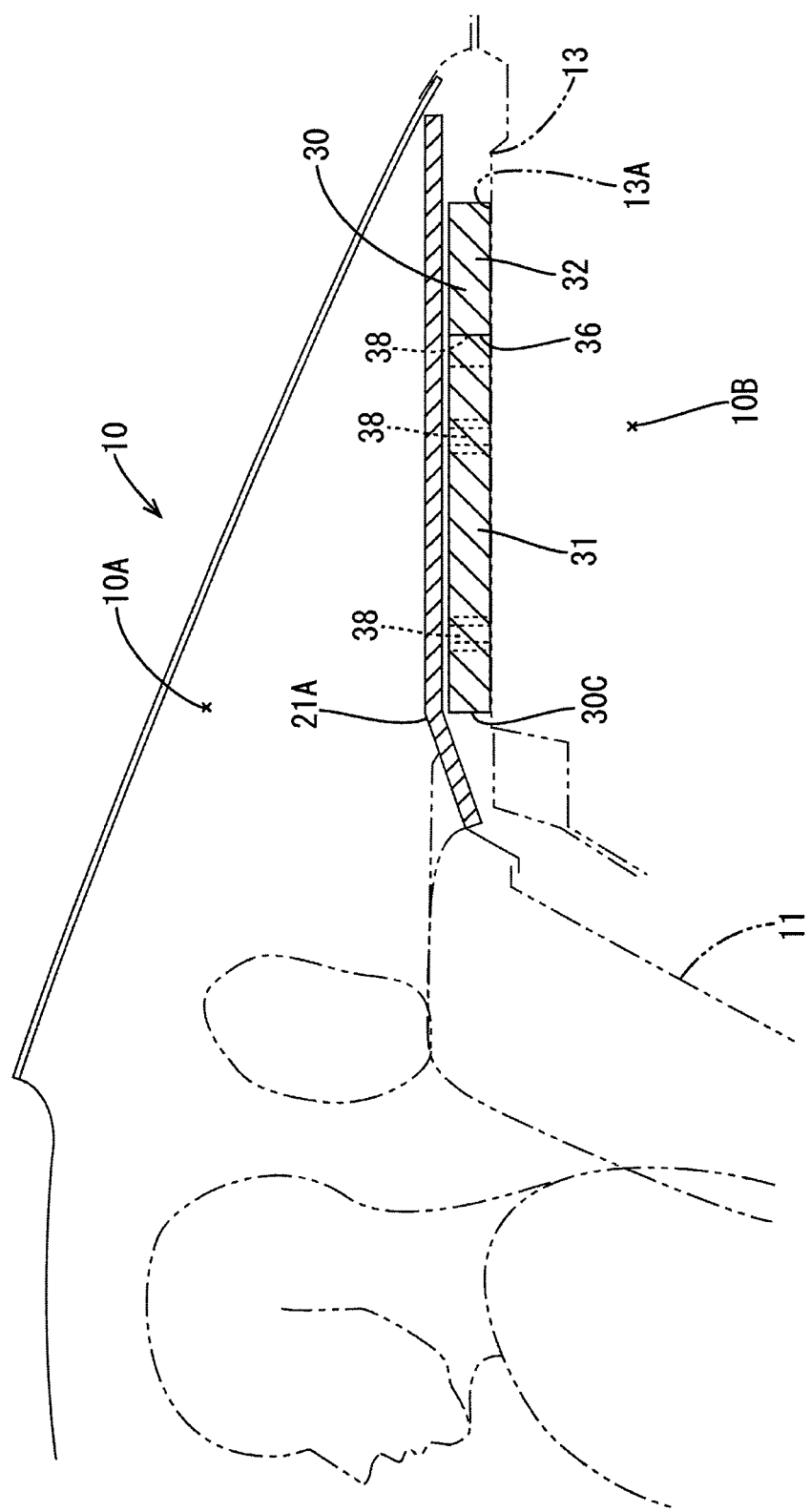
FIG. 2 is a cross-sectional view of the vehicular interior part mounted on a vehicular panel without having a panel-side hole.
Figure 3:
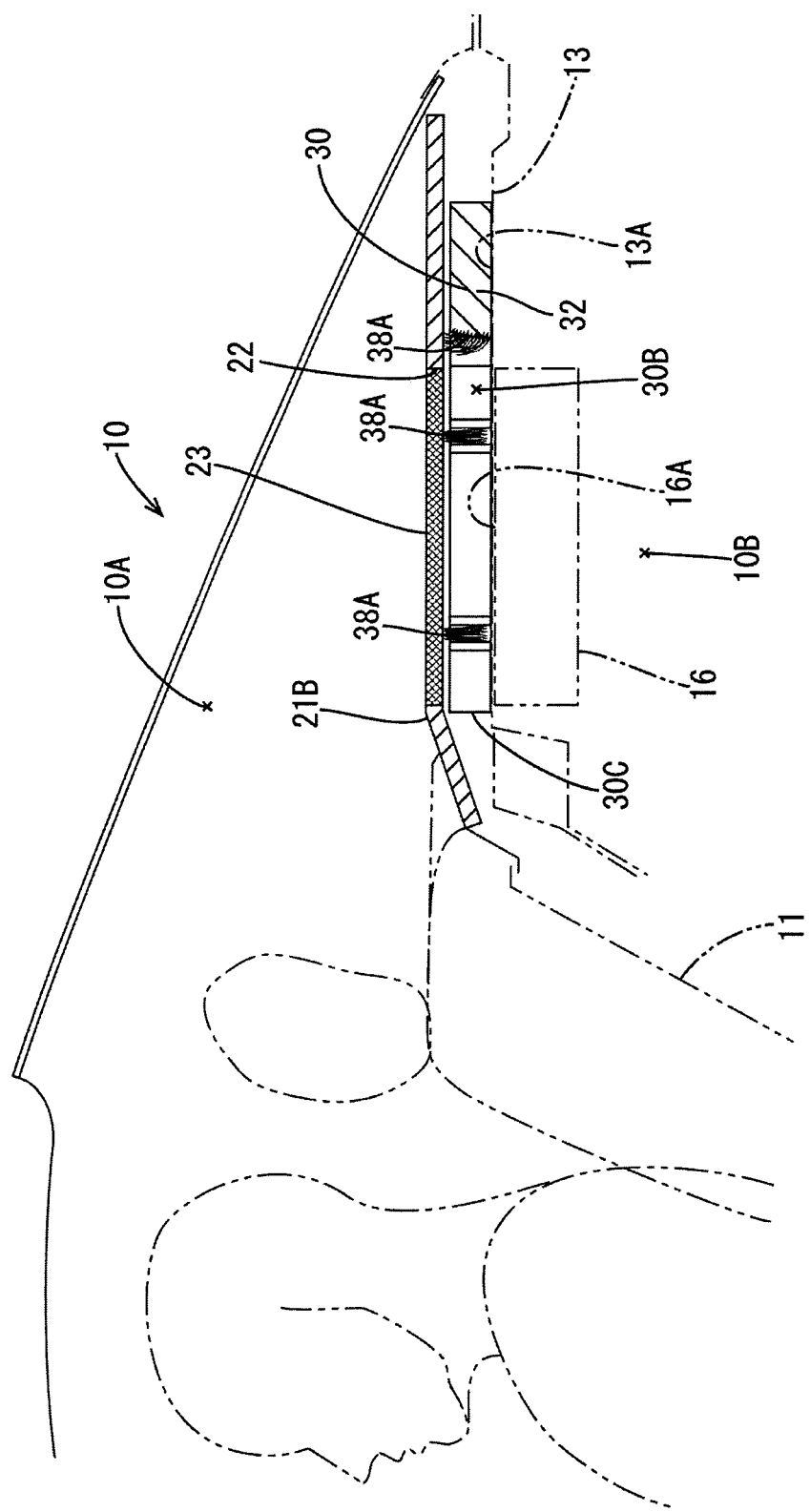
FIG. 3 is a cross-sectional view of the vehicular interior part mounted on a vehicular panel having the panel-side hole.

The upper back panel 13 is formed by pressing a metal plate such as iron or aluminum and extends in a vehicular width direction and a vehicular front-rear direction between a pair of roof side inner panels (not illustrated). As illustrated in FIGS. 2 and 3, the upper back panel 13 divides a vehicular rear space into a compartment space 10A that is an upper space and a luggage space 10B that is a lower space. A rear seat 11 is arranged on a vehicular front side of the upper back panel 13.

Figure 5:
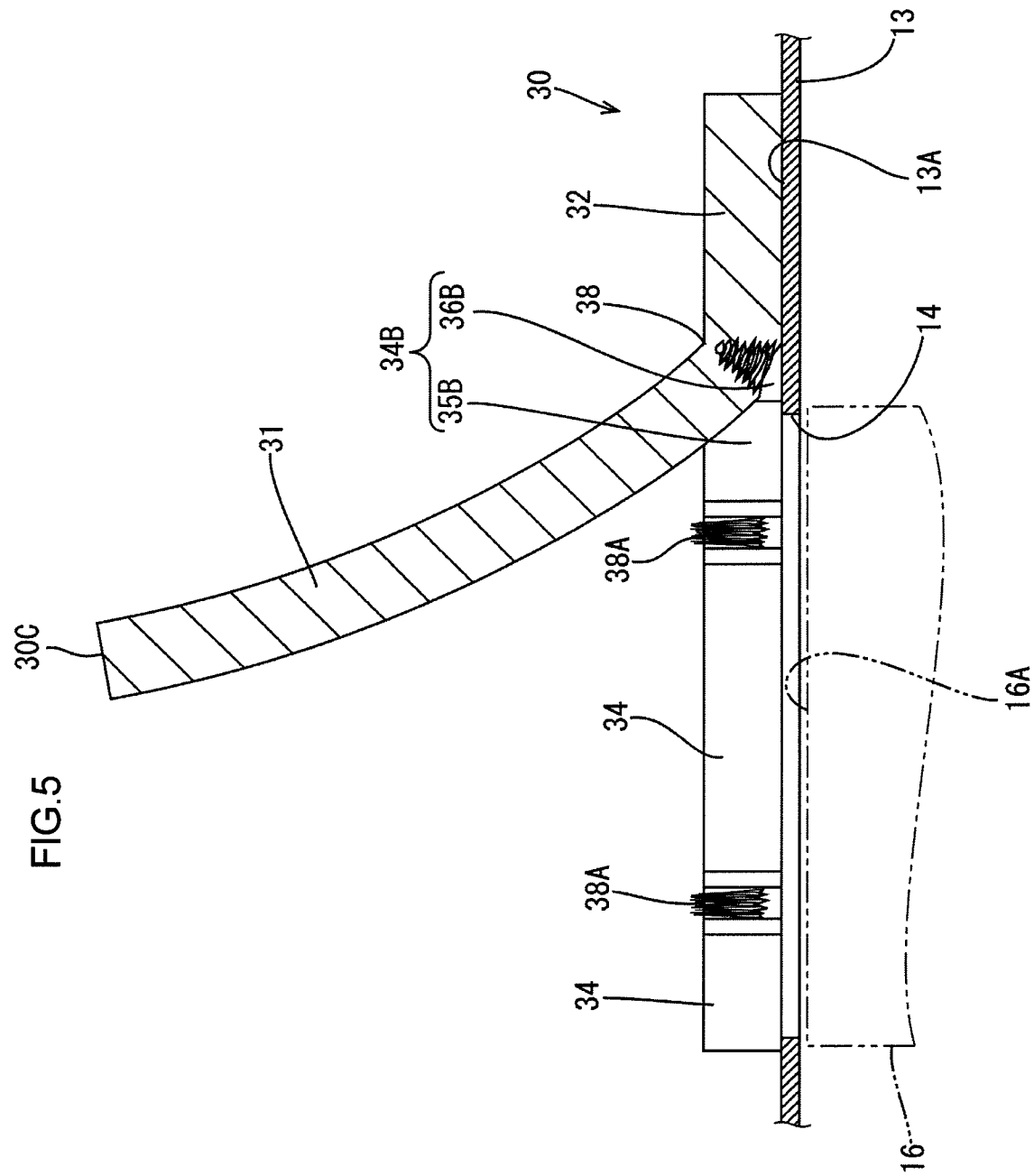
FIG. 5 is a cross-sectional view illustrating the sound absorbing member where a hole cover section is being separated from a panel cover section.
Figure 6:
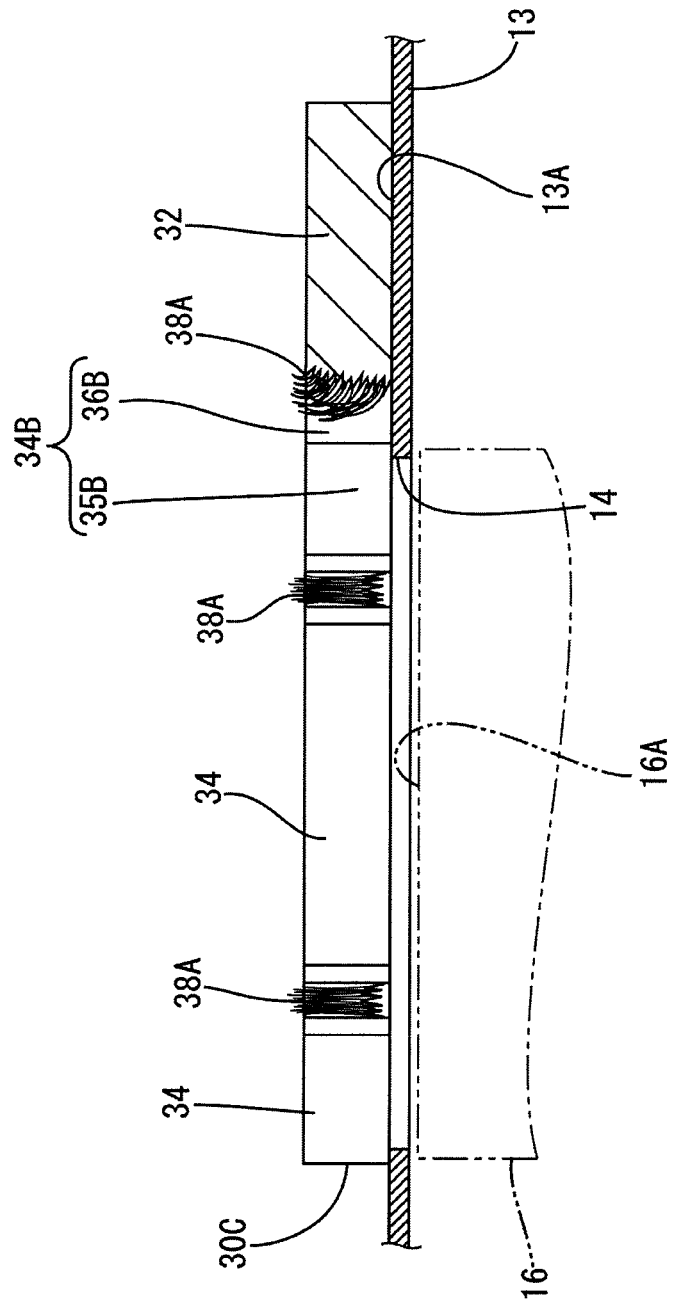
FIG. 6 is a cross-sectional view illustrating the sound absorbing member where the hole cover section is separated from the panel cover section.

As illustrated in FIGS. 5 and 6, the upper back panel 13 has a panel-side hole 14 where a speaker (a functional part) 16 is arranged. Sound from the speaker 16 is output to a vehicular interior space through the panel-side hole 14.

Figure 7:
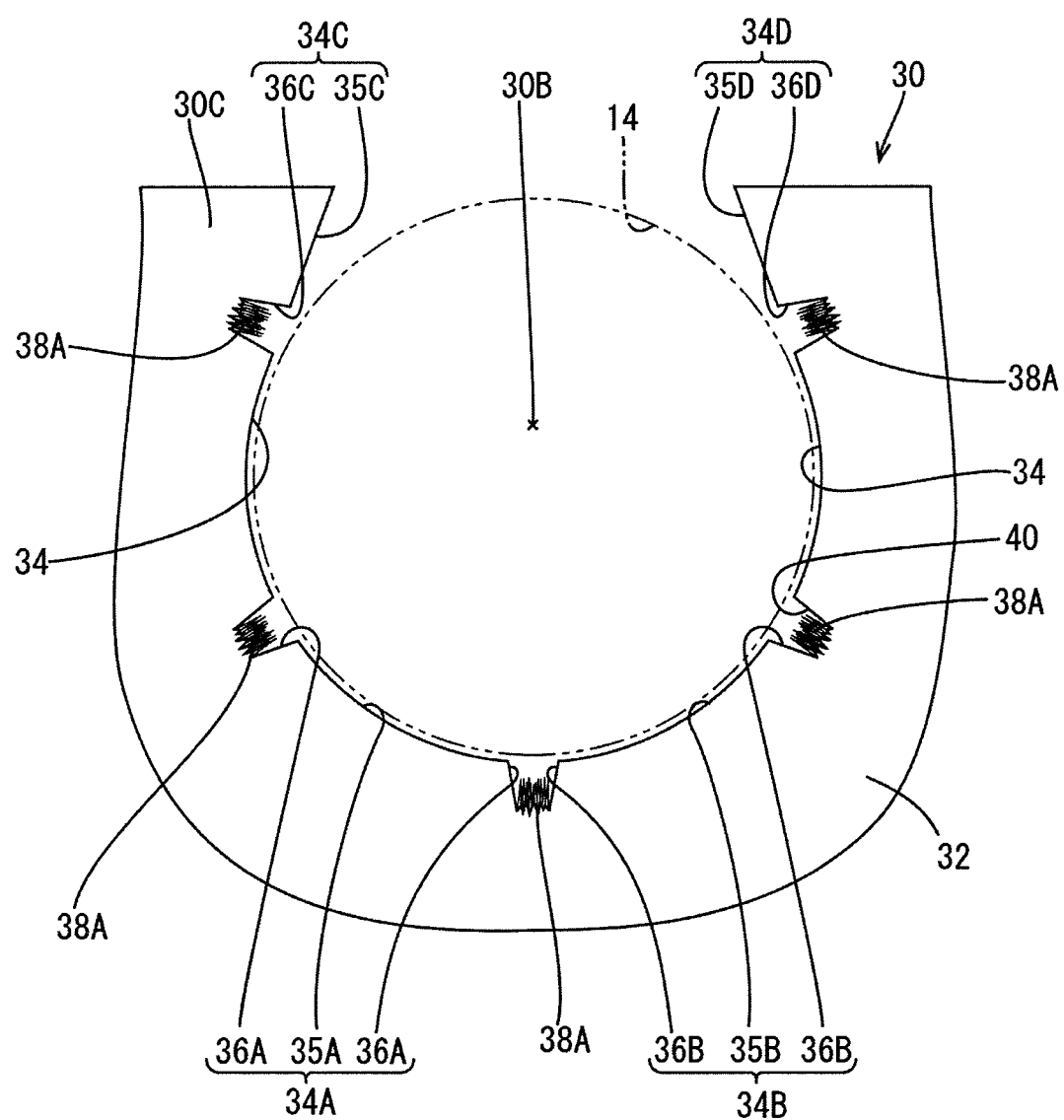
FIG. 7 is a plan view illustrating the sound absorbing member where the hole cover section is separated from the panel cover section.

As illustrated in FIGS. 6 and 7, the panel-side hole 14 has a shape following an outline of an output surface 16A of the speaker 16 through which sound is output. Specifically, the panel-side hole 14 has a circular shape. A mount portion is included at a hole edge of the panel-side hole 14 and the speaker 16 is mounted on the mount portion of the upper back panel 13 via a fixing member (not illustrated). As illustrated in FIG. 3, the speaker 16 is mounted in the luggage room 10B such that the output surface 16A is exposed to the vehicular interior side through the panel-side hole 14 of the upper back panel 13.

Figure 1:
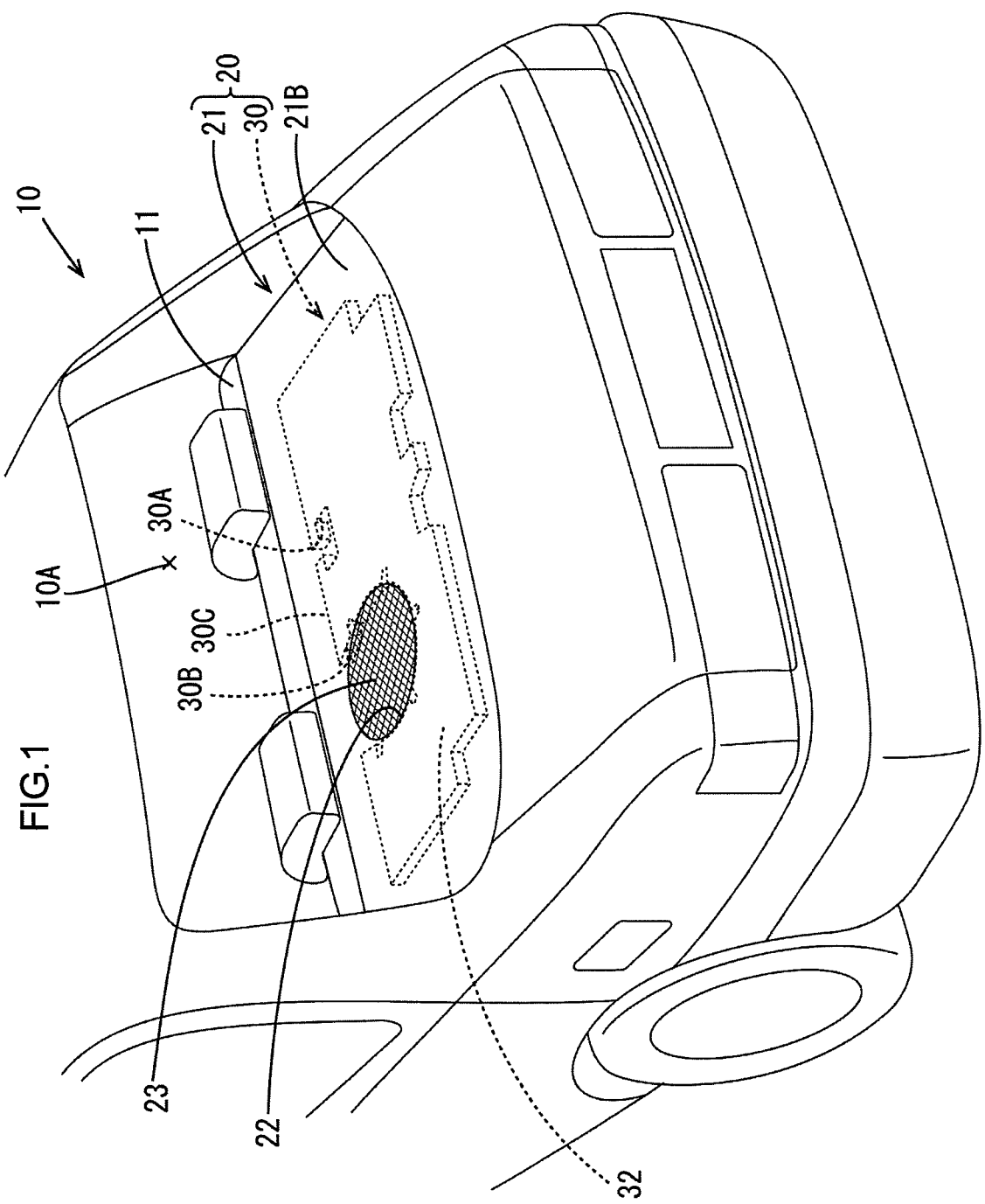
FIG. 1 is a perspective view of a vehicular interior part according one embodiment of the present technology.

As illustrated in FIG. 1, the vehicular interior part 20 includes a package tray (an interior part body) 21 and a sound absorbing member 30 that is arranged on the upper back panel 13 side of the package tray 21. The package tray 21 of the vehicular interior part 20 has a design surface on an upper surface thereof and the sound absorbing member 30 restricts noise caused by rear tires (not illustrated) from being transferred from the luggage space 10B into the vehicular interior space 10A.

The package tray 21 is a plate member made of thermoplastic resin and a skin may be bonded to or integrally formed with the package tray 21, if necessary. One of two types of package trays 21 including a first package tray 21A and a second package tray 21B is selectively used according to a specification whether having the speaker 16 or not. The first package tray 21A has a same configuration in a section thereof covering the panel-side hole 14 and in a section thereof covering an upper surface 13A of the upper back panel 13.

The second package tray 21B has a speaker grill mount hole 22 in a section thereof covering the panel-side hole 14, and a speaker grill 23 is mounted in the speaker grill mount hole 22. The second package tray 21B is obtained by forming the speaker grill mount hole 22 in the first package tray 21A. Therefore, one type of package tray 21 is commonly used for the first package tray 21A and the second package tray 21B included in the vehicular interior part 20.

Figure 4:
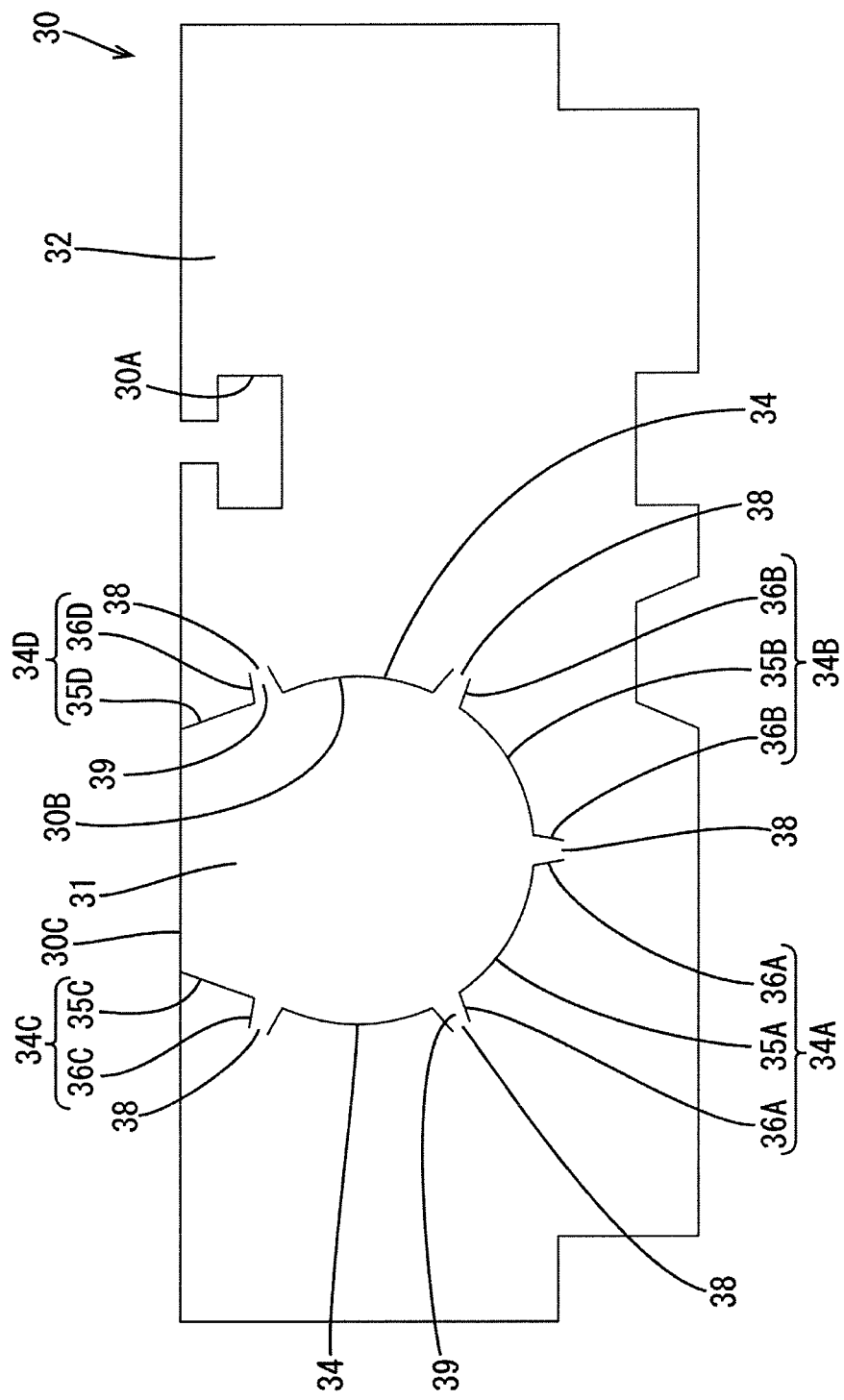
FIG. 4 is a plan view of the sound absorbing member.

As illustrated in FIGS. 1 and 4, the sound absorbing member 30 is a plate member including fibers. Specifically, the sound absorbing member 30 is made of a non-woven cloth or a felt and has flexibility and is a large volume member including an air layer between the fibers. The sound absorbing member 30 has a plan view outline slightly smaller than that of the package tray 21 and extends over substantially an entire area of the package tray 21.

As illustrated in FIGS. 2 and 4, the sound absorbing member 30 is arranged on the upper back panel 13 side with respect to the package tray 21 and extends along the upper back panel 13 so as to collectively cover the panel-side hole 14 and the upper surface 13A of the upper back panel 13. The sound absorbing member 30 has a hole 30A for a functional part (such as a belt path) other than the speaker 16 commonly for each model and selectively has a hole 30B through which the speaker 16 is exposed according to a model.

As illustrated in FIG. 4, the sound absorbing member 30 includes a hole cover section 31 in a section thereof covering the panel-side hole 14 and a panel cover section 32 in a section thereof covering the upper surface 13A of the upper back panel 13. The sound absorbing member 30 further includes slits 34 at a border between the hole cover section 31 and the panel cover section 32. According to such a configuration, the hole cover section 31 can be tore off from the sound absorbing member 30 and separated from the panel cover section 32. The hole cover section 31 is surrounded by the slits 34 and has a substantially circular area including a vehicular front-side edge 30C of the sound absorbing member 30. Specifically, the sound absorbing member 30 has six slits 34 and the slits 34 are arranged continuously from the front-side edge 30C along the outline of the panel-side hole 14 and arranged in a C-shape. The slits 34 are arranged along a hole edge of the panel-side hole 14.

As illustrated in FIG. 4, each of the slits 34 has a substantially elongated shape and are arranged next to each other in a longitudinal direction thereof. The slits 34 are through a thickness of the sound absorbing member 30. Among the six slits 34, a first slit 34A and a second slit 34B that are next to each other will be described. The first slit 34A and the second slit 34B are arranged such that an end of the first slit 34A is opposite an end of the second slit 34B. The first slit 34A and the second slit 34B are a third one and a fourth one from the front-side edge 30C and are arranged on a vehicular rear side. The adjacent slits 34 of the six slits 34 have the same configuration as that of the first slit 34A and the second slit 34B and will not be described. A third slit 34C and a fourth slit 34D on the edge 30C of the sound absorbing member 30 extend to the edge 30C and are cut and open at the edge 30C.

As illustrated in FIG. 4, the first slit 34A includes a first peripheral extending portion 35A extending along the hole edge of the panel-side hole 14 and first projecting portions 36A projecting from each end of the first peripheral extending portion 35A toward the panel cover section 32. The second slit 34B includes a second peripheral extending portion 35B extending along the hole edge of the panel-side hole 14 and second projecting portions 36B projecting from each end of the second peripheral extending portion 35B toward the panel cover section 32. One of the first projecting portions 36A is opposite one of the second projecting portions 36B. Thus, the slits 34 can be arranged along the hole edge of the panel-side hole 14. The first peripheral extending portion 35A, the second peripheral extending portion 35B, the first projecting portion 36A, and the second projecting portion 36B are through the thickness of the sound absorbing member 30. The third slit 34C includes a third peripheral extending portion 35C and a third projecting portion 36C extending from one end of the third peripheral extending portion 35C. Another end of the third peripheral extending portion 35C is open at the edge 30C. The fourth slit 34D has a similar configuration as that of the third slit 34C and includes a fourth peripheral extending portion 35D and a third projecting portion 36D. The third peripheral extending portion 35C, the fourth peripheral portion 35D, the third projecting portion 36C, and the fourth projecting portion 36D are through the thickness of the sound absorbing member 30.

As illustrated in FIG. 4, the hole cover section 31 and the panel cover section 32 of the sound absorbing member 30 are continuous via a continuous part 38 between the one first projecting portion 36A and the one second projecting portion 36B that are opposite each other. The hole cover section 31 is continuous to the panel cover section 32 via five continuous parts 38 that are present dispersedly along the outline of the hole cover section 31.

As illustrated in FIG. 7, the first peripheral extending portion 35A and the second peripheral extending portion 35B extend along the outline of the panel-side hole 14 and near the hole edge of the panel-side hole 14. According to such a configuration, the panel cover section 32 can extend as large as possible to the hole edge of the panel-side hole 14 and the sound absorbing properties are effectively ensured with the panel cover section 32.

As illustrated in FIG. 4, the first projecting portion 36A and the second projecting portion 36B that are opposite each other have a connection section 39 therebetween. The connection section 39 between the first projecting portion 36A and the second projecting portion 36B has a width that is decreased as is closer to the continuous part 38 from respective ends of the first peripheral extending portion 35A and the second peripheral extending portion 35B. The first projecting portion 36A and the second projecting portion 36B are closer to each other as they extend from the respective ends of the first peripheral extending portion 35A and the second peripheral extending portion 35B toward the continuous part 38. Namely, the first projecting portion 36A and the second projecting portion 36B that are opposite each other form substantially a V-shape.

The first projecting portion 36A and the second projecting portion 36B form an obtuse angle with respect to the first peripheral extending portion 35A and the second peripheral extending portion 35B, respectively. The first projecting portion 36A and the second projecting portion 36B extend from the respective ends of the first peripheral extending portion 35A and the second peripheral extending portion 35B toward an outside of the panel-side hole 14 and the extended ends of the first projecting portion 36A and the second projecting portion 36B are opposite each other have a smallest distance therebetween at the continuous part 38. Namely, the hole cover section 31 includes the connection section 39 that projects outward to be tapered and is continuous to the continuous part 38.

As illustrated in FIGS. 4 and 7, the continuous part 38 is on an outer side of the panel-side hole 14 with respect to the first peripheral extending portion 35A and the second peripheral extending portion 35B. The continuous part 38 is at a position connecting the extended ends of the first projecting portion 36A and the second projecting portion 36B. Therefore, strength of the continuous part 38, that is, connection strength between the hole cover section 31 and the panel cover section 32 can be adjusted by changing the width dimension of the connection section 39 that is between the extended ends of the first projecting portion 36A and the second projecting portion 36B. Furthermore, an extending dimension of the first projecting portion 36A and the second projecting portion 36B from the first peripheral extending portion 35A and the second peripheral extending portion 35B toward the outside of the panel-side hole 14 (the position of the continuous part 38) is determined such that fibers extending from a torn-off surface 38A of the continuous part 38 after tearing-off of the hole cover section 31 from the sound absorbing member 30 are put within the space between the first projecting portion 36A and the second projecting portion 36B.

Next, a structure of the sound absorbing member 30 of the vehicular interior part 20 will be described. The sound absorbing member 30 may have any one of a first structure illustrated in FIG. 2 and a second structure illustrated in FIG. 3 according to the vehicle model in which the vehicular interior part 20 is to be mounted. Specifically, if the vehicular interior part 20 is mounted in the upper back panel 13 without having the speaker 16 in the panel-side hole 14, the sound absorbing member 30 is not required to have a hole 30B for the speaker 16. Therefore, the sound absorbing member 30 includes the panel cover section 32 covering the upper surface 13A of the upper back panel 13 and the hole cover section 31 covering the panel-side hole 14. Thus, the sound absorbing member 30 has the first structure as illustrated in FIG. 2.

If the vehicular interior part 20 is mounted in the upper back panel 13 having the speaker 16 in the panel-side hole 14, the sound absorbing member 30 is required to have the hole 30B for the speaker 16. Therefore, the sound absorbing member 30 includes the panel cover section 32 covering the upper surface 13A of the upper back panel 13 and does not include the hole cover section 31. The hole 30B is formed by tearing off the hole cover section 31 from the sound absorbing member 30 at the continuous parts 38 including one between the first projecting portion 36A and the second projecting portion 36B and separating the hole cover section 31 from the panel cover section 32. Accordingly, the panel-side hole 14 is open toward the package tray 21 through the hole 30B. Thus, the sound absorbing member 30 has the second structure as illustrated in FIG. 3.

Hereinafter, a method of mounting the sound absorbing member 30 having the first structure into the upper back panel 13 and a method of mounting the sound absorbing member 30 into the upper back panel 13 and altering the structure of the sound absorbing member 30 to the second structure will be described.

The sound absorbing member 30 of the first structure is mounted on the upper surface 13A of the upper back panel 13 without having the speaker 16 in the panel-side hole 14. Accordingly, the hole cover section 31 covers the panel-side hole 14 and the panel cover section 32 covers the upper surface 13A of the upper back panel 13. The panel cover section 32 of the sound absorbing member 30 is fixed to the upper back panel 13 with clips, which are not illustrated.

The hole cover section 31 is continuous to the panel cover section 32 via the continuous parts 38 and is fixed to the upper back panel 13 via the panel cover section 32. The hole cover section 31 is not separated from the panel cover section 32 and the package tray 21A is disposed on the sound absorbing member 30 including the hole cover section 31 and the panel cover section 32. Accordingly, at least a part of the panel cover section 32 is pressed toward the upper back panel 13 with the package tray 21A and fixed to the upper back panel 13. Thus, the sound absorbing member 30 of the first structure is mounted in the upper back panel 13.

For a vehicle model having the speaker 16, the sound absorbing member 30 is mounted in the vehicle as described below. The sound absorbing member 30 of the first structure is mounted on the upper surface 13A of the upper back panel 13 having the speaker 16 in the panel-side hole 14. Similar to the method of mounting the sound absorbing member 30 in the upper back panel 13 without having the speaker 16, the panel cover section 32 of the sound absorbing member 30 is fixed to the upper back panel 13 with clips, which are not illustrated. As illustrated in FIG. 5, the front-side edge 30C of the hole cover section 31 is held by an operator and pulled upwardly and frontward with respect to the hole cover section 31. The hole cover section 31 can be lifted up easily because the slits 34C, 34D on the edge 30C are open at the edge 30C. The hole cover section 31 is pulled upwardly and frontward and the continuous sections 38 are torn off sequentially from the vehicular front-side one and the hole cover section 31 is separated from the panel cover section 32 as illustrated in FIG. 6. Thus, the hole 30B for the speaker 16 is formed in the sound absorbing member 30 at the position of the hole cover section 31.

The torn-off surface 38A of the connection section 39 at the continuous part 38 and the first projecting portion 36A and the second projecting portion 36B on the both sides of the connection section 39 form a recessed portion 40 recessed from the peripheral extending portions 35A, 35B toward the outside of the panel-side hole 14. As illustrated in FIG. 7, the fibers extending from the torn-off surface 38A of the continuous part 38 toward a center of the panel-side hole 14 are within a space of the recessed portion 40. Then, the package tray 21B is disposed on the sound absorbing member 30 having the panel cover section 32 and without having the hole cover section 31. Then, at least a part of the panel cover section 32 is pressed toward the upper back panel 13 with the package tray 21B and fixed to the upper back panel 13. Thus, the sound absorbing member 30 of the second structure is mounted in the upper back panel 13.

Next, advantageous effects according to this embodiment will be described. According to this embodiment, one kind of sound absorbing member 30 can be used as the sound absorbing member having one of the first structure and the second structure. The sound absorbing member 30 is commonly used as the one having the first structure and the one having the second structure. Therefore, the number of types of the parts can be reduced compared to a configuration in that different types of parts are necessarily used for each of the one having the first structure and the one having the second structure.

In altering the structure of the sound absorbing member 30 from the first structure to the second structure, the hole cover section 31 is torn off from the sound absorbing member 30 and is separated from the panel cover section 32 at the continuous part 38 between the first projecting portion 36A and the second projecting portion 36B. The fibers extending from the torn-off surface 38A at the continuous part 38 are present within the recessed portion 40. Therefore, the fibers extending from the torn-off surface 38A are less likely to be within the hole 30B and less likely to be on an inner side from the first peripheral extending portion 35A and the second peripheral extending portion 35B. Thus, the fibers extending from the torn-off surface 38A do not enter the panel-side hole 14 unintentionally and the functionality of the speaker 16 is less likely to be deteriorated.

As another structure for restricting the fibers extending from the torn-off surface 38A from unintentionally entering the panel-side hole 14, all of the slits may be formed in positions on the sound absorbing member closer to the panel cover section 32 from the hole edge of the panel-side hole 14. Namely, the slits 34 are disposed outside the panel-side hole 14 and the area surrounded by the slits 34 is increased and the area of the hole cover section is increased. If the sound absorbing member having such a configuration is used as the one having the second structure, the area of the hole cover section that is separated from the panel cover section is increased and the hole formed in the sound absorbing member for the speaker is larger. Therefore, the area covered with the sound absorbing member 30 (the panel cover section) is decreased and the sound absorbing properties of the vehicular interior part may be deteriorated.

According to this embodiment, the silts 34 include the peripheral extending portions 35A, 35B extending along a periphery of the panel-side hole 14 and the projecting portions 36A, 36B extending from the peripheral extending portions 35A, 35B toward the panel cover section 32. According to such a configuration, the area surrounded by the slits 34 can be smallest and the area of the hole cover section 31 is smallest. Therefore, the area of the hole 31B can be smaller and the area of the panel cover section 32 can be largest, and the sound absorbing properties of the panel cover section 32 are effectively obtained. The fibers extending from the torn-off surface 38 can be put within the recess portion 40 defined by the projecting portions 36A, 36B and the functionality of the speaker 16 and the sound absorbing properties of the panel cover section 32 are both effectively obtained.

The first projecting portion 36A and the second projecting portion 36B that are opposite each other are formed in substantially a V-shape such that the connection section 39 between the first projecting portion 36A and the second projecting portion 36B is decreased in thickness as is closer to the continuous part 38. According to such a configuration, reaction stress is likely to be concentrated on the continuous part 38 when the hole cover section 31 is torn off from the sound absorbing member 30 and separated from the panel cover section 32. Thus, the hole cover section 31 can be effectively separated from the panel cover section 32.

Further, the continuous parts 38 are dispersedly included around the hole cover section 31. According to such a configuration, the sound absorbing member 30 of the first structure can receive external force acting on the continuous parts 38 dispersedly at each of the continuous parts 38, and the hole cover section 31 is less likely to be separated from the panel cover section 32 unintentionally. In the configuration including three or more continuous parts 38 like this embodiment, the hole cover section 31 is less likely to be displaced or deformed with respect to the panel cover section 32 in a thickness direction and a plane surface direction. Therefore, such a configuration including three or more continuous parts 38 is preferable. In a configuration including four or more continuous parts 38, even if one continuous part 38 is torn off unintentionally, the hole cover section 31 can be held properly with other continuous parts 38.

According to this embodiment, the speaker 16 is an example of the functional part and sound is output through the panel-side hole 14 toward the vehicular interior space. In the sound absorbing member 30 of the second structure, the fibers extending from the torn-off surface 38A are less likely to enter the panel-side hole 14 unintentionally and the sound output from the speaker 16 is less likely to be adversely affected by the fibers.

Other Embodiments

The present technology is not limited to the description as described above with reference to the drawings. For example, the present technology may include following embodiments.

(1) In the above embodiment, the speaker having a circular output surface is used as the functional part. However, it is not limited thereto. The functional parts are not limited to acoustic components such as the speakers but may be safety components such as a retractor or a belt path or components having various functions such as an air cleaner. A size, a shape, or a position of the hole in the sound absorbing member may be altered according to a structure of the functional part or the upper back panel.

(2) In the above embodiment, one of the first package tray and the second package tray is used according to the presence of the speaker. However, it is not limited thereto. For example, the second package tray may be used for the vehicle model without having the speaker.

(3) Other than the above embodiment, a structure of the sound absorbing member and a size, a shape, and a position of the hole cover section and the panel cover section may be altered, if necessary. For example, the hole cover section may not include the front-side edge but may include a rear-side edge or may be included in an inner part of the sound absorbing member as an island form.

(4) In the above embodiment, the sound absorbing member is disposed on the upper back panel. However, the sound absorbing member may be disposed on a back surface of the package tray.

(5) Other than the above embodiment, the mounting structure of the sound absorbing member may be altered, if necessary. For example, the hole cover section may be pulled toward the vehicular front side with respect to the panel cover section.

(6) Other than the above embodiment, a shape, a position, a length dimension, and the number of the slits may be altered, if necessary. In the above embodiment, the adjacent slits have the same configuration as that of the first slit and the second slit. However, it is not limited thereto. For example, if the adjacent slits are disposed in positions of the panel cover section far away from a hole edge of the hole, the slits may not include the projecting portions.

(7) In the above embodiment, the first projecting portion and the second projecting portion form substantially a V-shape. However, it is not limited thereto. The first projecting portion and the second projecting portion may be parallel to each other or may be formed in an asymmetrical shape with respect to a direction in which the hole cover section is pulled.

(8) In the above embodiment, the vehicular interior part that covers the upper back panel is used. However, the vehicular interior part may be a pillar garnish that covers a pillar panel or a door trim that covers a door panel.

The invention claimed is:

1. A vehicular interior part covering a vehicular panel from a vehicular interior side, the vehicular interior part comprising:
   an interior part body; and
   a sound absorbing member that comprises a plate member including fibers and is disposed along the vehicular panel and between the interior part body and the vehicular panel, the sound absorbing member including
      a hole cover that covers a panel-side hole of the vehicular panel, the panel-side hole configured to receive a functional part,
      a panel cover that covers an upper surface of the vehicular panel,
      slits that are disposed between the hole cover and the panel cover, define the hole cover and along which the hole cover is separable from the panel cover, the slits including a first slit and a second slit that are positioned next to each other
      the first slit including a first peripherally extending portion configured to follow a shape of the panel-side hole and a first projecting portion extending radially from an end of the first peripherally extending portion toward the panel cover section,
      the second slit including a second peripherally extending portion configured to follow the shape of the panel-side hole and a second projecting portion extending radially from an end of the second peripherally extending portion toward the panel cover section, the first projecting portion and the second projecting portion being opposite each other, and
      a continuous part positioned between the first projecting portion and the second projecting portion, the hole cover and the panel cover being rendered continuous via the continuous part, wherein
   the hole cover is tearable from the sound absorbing member at the continuous part and the hole cover is separable from the panel cover section along the slits such that a hole is provided at a position of the hole cover and the functional part that is received by the panel-side hole is exposed though the panel-side hole and the hole in the sound absorbing member.

2. The vehicular interior part according to claim 1, wherein distal ends of the first projecting portion and the second projecting portion are closer to each other than the proximal ends of the first projecting portion and the second projecting portion.

3. The vehicular interior part according to claim 1, wherein the functional part is a speaker that outputs sound toward a vehicular interior side through the panel-side hole and the hole formed in the sound absorbing member.

4. The vehicular interior part according to claim 1, wherein each of the slits has an elongated shape and the slits are arranged in an elongated direction thereof.

5. The vehicular interior part according to claim 1, wherein
   the sound absorbing member includes edges,
   the slits include a third slit that is open at one of the edges.

6. The vehicular interior part according to claim 1, wherein the first slit further includes another first projecting portion extending radially from another end of the first peripherally extending portion and the second slit further includes another second projecting portion extending radially from another end of the second peripherally extending portion.

7. The vehicular interior part according to claim 1, wherein the slits are provided at a border between the hole cover and the panel cover.

8. The vehicular interior part according to claim 1, wherein the slits are outside the panel-side hole.

9. The vehicular interior part according to claim 1, wherein the sound absorbing member includes edges, and the slits include a third slit that is one of the edges and is open at the one edge and the hole cover includes the one edge.

10. The vehicular interior part according to claim 5, the third slit includes a third peripherally extending portion and a third projecting portion at one end of the third peripherally extending portion and another end of the third peripherally extending portion is open on the one edge.

11. The vehicular interior part according to claim 6, wherein
   the sound absorbing member includes edges,
   the slits further include a third slit, the third slit including a third peripherally extending portion that follows the shape of the panel side hole, a third projecting portion extending radially from an end of the third peripherally extending portion, and another continuous part provided between the first projecting portion and the third projecting portion,
   and the third peripherally extending portion includes another end that is open at one of the edges of the sound absorbing member.

12. The vehicular interior part according to claim 1, each of the first peripherally extending portion and the second peripherally extending portion having an arcuate shape, the first projecting portion extending radially from an end of the first peripherally extending portion and the second projecting portion extending radially from an end of the second peripherally extending portion.

13. The vehicular interior part according to claim 1, the first projecting portion and the second projecting portion extending at an angle from the first peripherally extending portion and from the second peripherally extending portion, respectively.

* * * * *